(12) United States Patent
Li

(10) Patent No.: US 9,424,879 B1
(45) Date of Patent: Aug. 23, 2016

(54) DATA STORAGE DEVICE WITH ADAPTIVE DATA CAPACITY

(71) Applicant: Seagate Technology LLC, Cupertino, CA (US)

(72) Inventor: Feng Li, Victoria, MN (US)

(73) Assignee: Seagate Technology LLC, Cupertino, CA (US)

(*) Notice: Subject to any disclaimer, the term of this patent is extended or adjusted under 35 U.S.C. 154(b) by 0 days.

(21) Appl. No.: 14/701,172

(22) Filed: Apr. 30, 2015

(51) Int. Cl.
- G11B 27/36 (2006.01)
- G11B 20/12 (2006.01)
- G11B 5/09 (2006.01)
- G11B 5/60 (2006.01)
- G11B 20/18 (2006.01)

(52) U.S. Cl.
CPC .............. G11B 20/1217 (2013.01); G11B 5/09 (2013.01); G11B 5/6011 (2013.01); G11B 20/18 (2013.01); G11B 2020/1238 (2013.01)

(58) Field of Classification Search
CPC .......... G11B 20/18; G11B 2220/1238; G11B 27/36; G11B 5/012; G11B 5/00; G11B 5/02; G11B 2220/90; G11B 2220/20
USPC ................... 360/31, 55, 48, 51, 53
See application file for complete search history.

(56) References Cited

U.S. PATENT DOCUMENTS

| | | | |
|---|---|---|---|
| 5,999,352 A | 12/1999 | Teck et al. | |
| 6,446,156 B1 | 9/2002 | Chia et al. | |
| 6,757,119 B2 | 6/2004 | Leow et al. | |
| 6,795,261 B2 | 9/2004 | Chia et al. | |
| 7,362,529 B2 | 4/2008 | Chiao et al. | |
| 7,929,233 B2 | 4/2011 | Bergevin | |
| 8,867,153 B1 | 10/2014 | Coker et al. | |
| 8,941,943 B1 | 1/2015 | Coker et al. | |
| 9,030,772 B2 * | 5/2015 | Kim ...................... | G11B 5/09 360/48 |
| 2013/0170064 A1 | 7/2013 | Kim | |

* cited by examiner

*Primary Examiner* — Nabil Hindi
(74) *Attorney, Agent, or Firm* — Hall Estill Attorneys at Law

(57) ABSTRACT

A data storage device can have one or more data bits that are stored on a data storage medium and accessed with a transducing head. The data bits may be organized on the data storage medium to provide a surface data capacity. A performance degradation can be predicted for the transducing head by a controller connected to the transducing head. In response to the predicted performance degradation, the surface data capacity of the data storage medium is decreased.

20 Claims, 3 Drawing Sheets

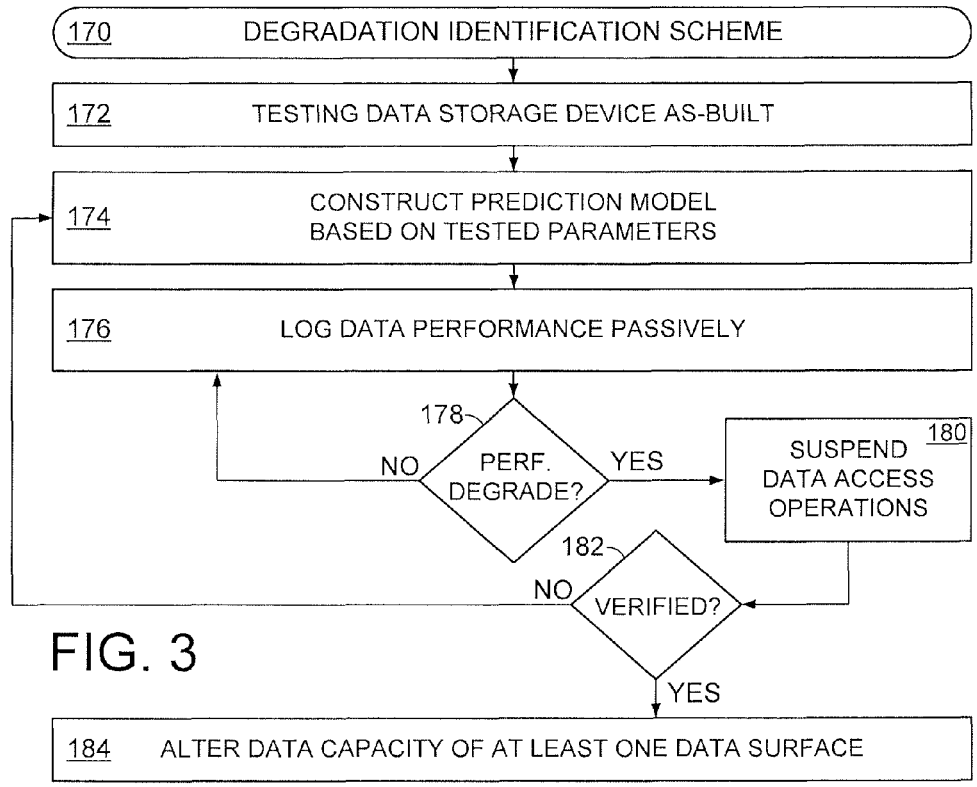
FIG. 3
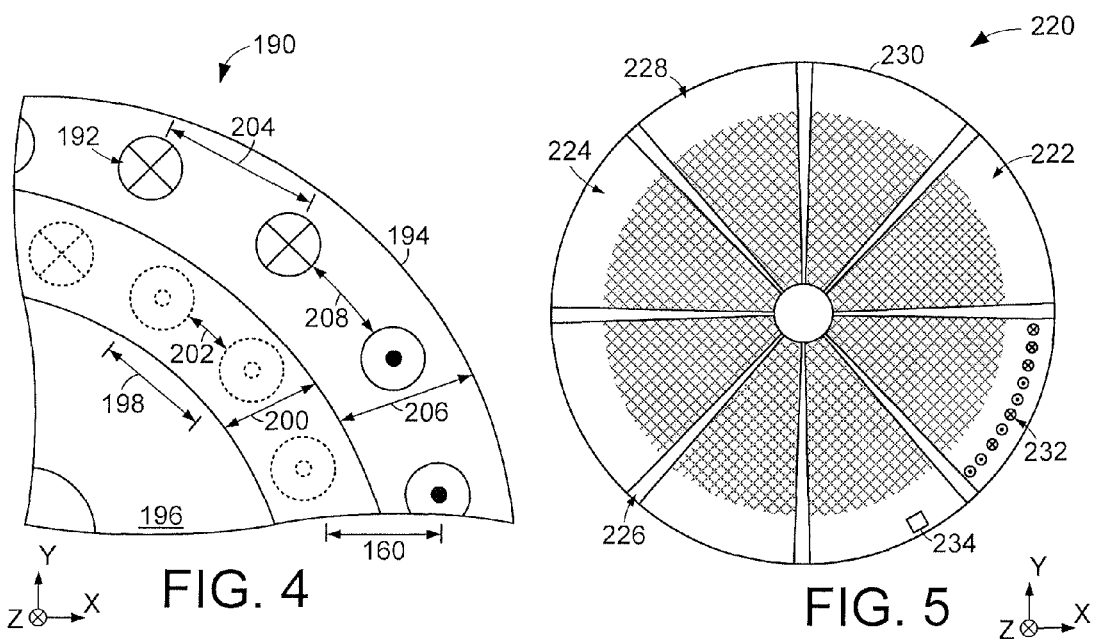
FIG. 4
FIG. 5

DATA STORAGE DEVICE WITH ADAPTIVE DATA CAPACITY

SUMMARY

A data storage device, in various embodiments, has data bits stored on a data storage medium and accessed with a transducing head. The data bits are organized on the data storage medium to provide a surface data capacity that is decreased in response to a performance degradation in the transducing head predicted by a controller connected to the transducing head.

BRIEF DESCRIPTION OF THE DRAWINGS

FIG. 3 shows a degradation identification scheme that may be utilized in accordance with various embodiments.

FIG. 4 depicts a top view line representation of a portion of an example data storage device configured in accordance with some embodiments.

FIG. 5 illustrates a block representation of a portion of an example data storage device arranged in accordance with various embodiments.

DETAILED DESCRIPTION

Data is being generated, transferred, and consumed at increasing rates that can be accommodated by raising the data storage capacity of data storage devices, such as hard disk drives, solid-state memory arrays, and hybrid data storage systems. In rotating data storage devices, data capacity can be increased by raising the data bit density of data bits, which corresponds with less non-magnetic material positioned between adjacent data bits. However, increased data bit density, particularly linear data bit density, can stress the performance of a data transducing assembly and cause transducing assemblies with degraded performance to be taken offline, which reduces the data capacity of a data storage device. Hence, there is an industry and consumer goal to provide a data storage device that can adapt data capacity to a degraded data transducing assembly.

It is contemplated that data transducing assemblies often degrade and fail post-manufacturing. That is, degradation and failures occur after user created data is stored in the data storage device, which makes deactivating a degraded data transducing assembly problematic to the capacity and performance of the data storage device. Accordingly, various embodiments re-manufacture at least one data storage surface of a data storage device in response to a predicted and/or detected degradation in performance of a data transducing head while the data storage device is maintained in an operational state, which can be characterized as re-manufacturing "in the field." The ability to decrease the data capacity of a data surface in the field can adapt to the performance degradation of a transducing head to maximize the capabilities of the degraded transducing head.

Figure 1:
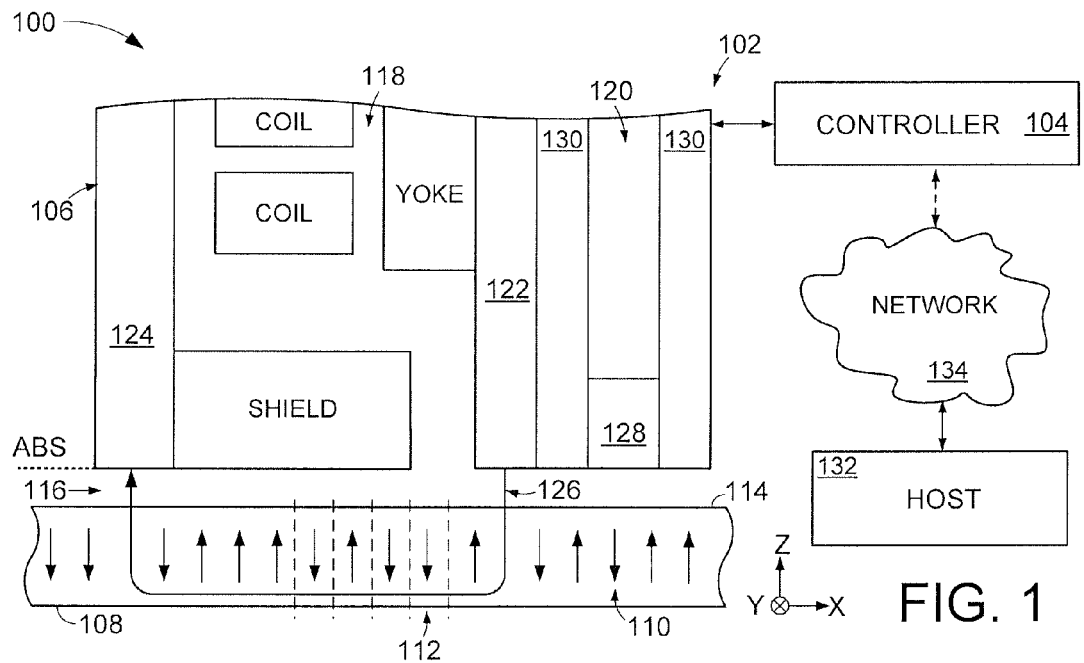
FIG. 1 is a line representation of a portion of an example data storage system configured and operated in accordance with some embodiments.

Although any type of data storage device can be re-manufactured in the field with the various embodiments of this disclosure, FIG. 1 displays a line representation of a portion of an example data storage system 100 that can be re-manufactured in accordance with assorted embodiments. The data storage system 100 can have any number and type of data storage device 102 that collectively provide a data capacity through data accessed directed by at least one controller 104. A controller 104 may be local or remote and can orchestrate movement of a transducing head 106 with rotation of a data storage medium 108 to write and read data bits 110 organized in data tracks 112 on the data storage medium 108.

It is contemplated that the data storage medium 108 can have multiple data surfaces 114 that concurrently store different sets of data bits 110. In the non-limiting embodiment shown in FIG. 1, a single data surface 114 is illustrated with data bits 110 perpendicularly oriented with respect to an air bearing 116 that separates the transducing head 106 from the data surface 114 and data storage medium 108. The controller 104 can individually and collectively utilize the data writer 118 and data reader 120 portions of the transducing head 106 to conduct data access operations. Data writing operations activate write 122 and return 124 poles to create a magnetic circuit 126 through the data storage medium 108. Data reading operations can activate a read sensor 128, such as a magnetoresistive (MR) lamination, that is separated from the data writer 118 by one or more magnetic shields 130.

The controller 104 can manipulate the transducing head 106 relative to the data storage medium 108 via an actuating assembly that can alter lateral and vertical transducing head 106 position along the X and Y axes, respectively. While at least one local controller 104 can provide data access operations, various embodiments employ one or more remote host 132, such as a server, node, or microprocessor, which is wired or wirelessly connected to the local controller 104 via a network 134. To increase the data storage capacity of the data storage device 102 and system 100, the data bits 110 can be positioned closer together in an increased data bit density arrangement.

Figure 2:
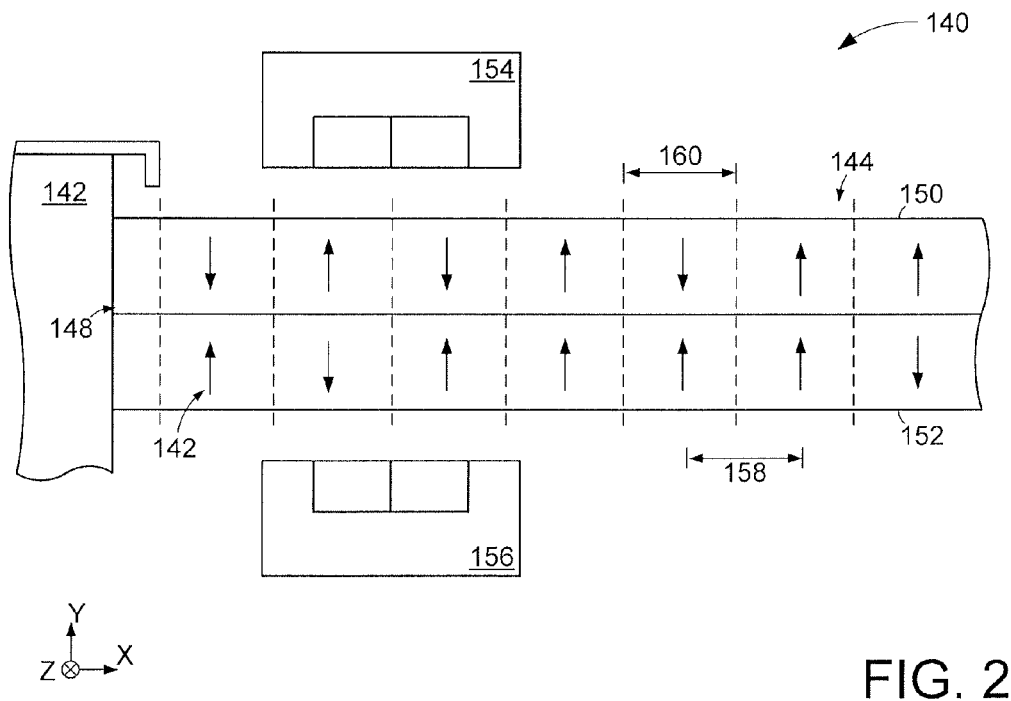
FIG. 2 displays a line representation of a portion of an example data storage device capable of being used with the data storage system of FIG. 1.

FIG. 2 displays a line representation of a portion of an example data storage device 140 configured with an elevated data bit density in accordance with some embodiments. As shown, a plurality of data bits 142 are positioned in circular shaped data tracks 144 centered at a spindle 146. The spindle 146 rotates to produce circular motion for the data storage medium 148 and air bearings proximal first 150 and second 152 data surfaces of the data storage medium 148. Different transducing heads 154 and 156 are respectively positioned proximal the respective data surfaces 150 and 152 on opposite sides of the data storage medium 148. The transducing heads 154 and 156 concurrently fly on the air bearings to conduct read and write data operations.

The respective data surfaces 150 and 152 can be configured similarly or differently. For example, manufacturing of the data storage device 140 can result in similar data bit 142 configurations for the data surfaces 150 and 152. The similar data bit 142 configurations can comprise similar data bit densities, number of data tracks 144, and overall data capacity corresponding with the collective number of data bits 142 on each data surface 150 and 152. Although not limiting, a data bit density can be defined linearly by the distance 158 between data bits 142 and regionally by the radial distance between data bits 142 combined with the linear distance 158. In other words, the data bit density can be characterized in one dimension (linear) or two dimensions for each data surface 150 and 152.

The data bit density of a data surface 150 and 152 corresponds with the track pitch 160 as larger pitch 160 values positions greater non-magnetic data storage medium 148 material between the data bits 142. With an optimally performing transducing head 154/156, the data bit density for each data surface 150 and 152 can be high as the heads 154/156 each have a magnetic resolution that can program and read individual data bits 142. However, degraded transducing head 154/156 performance can correspond with magnetic resolution volatility and/or decreased magnetic resolution where multiple data bits 142 are inadvertently and concurrently sensed or written, which can jeopardize the accuracy and speed of the data storage device 140.

Accordingly, a local or remote controller can conduct the example degradation identification scheme 170 in accordance with various embodiments to mitigate the effects of transducing head performance degradation. It is noted that the term "performance degradation" is not limited to a particular transducing head operating parameter and can be one or more operating conditions, such as delayed data writing times, inaccurate data writing, adjacent track interference, side track erasure, data reading errors, and loss of data signal. The scheme 170 begins by testing a data storage device as-built in step 172, which means after the data storage device is completed, but before user defined data is stored on one or more data storage surfaces in the data storage device.

The testing of step 172 can involve one or more different static and dynamic parameters, such as raw bit error rate (BER), hidden and visible data errors, servo demodulation quality metrics, read data channel quality metrics, and transducing transducing head fly height, which are used as baseline statistics for step 174 to construct at least one prediction model that identifies expected and unexpected deviations from the baseline. That is, the prediction modeling of step 174 can differentiate between transducing head behavior that indicates existing performance degradation and behavior that has a high probability of corresponding with future performance degradation. For example, a baseline bit error rate of 1 may be modeled in step 174 so that a BER of 0.9 is passively logged in step 176 as expected deviation while a BER of 1.1 is logged in step 176 as predicting future performance degradation and a BER of 1.15 is logged in step 176 as detected transducing head performance degradation.

Regardless of the number and content of the prediction models constructed in step 174 or the volume and time of performance characteristic logging in step 176, decision 178 can be continually, sporadically, routinely, and randomly consulted to determine if performance degradation has occurred or if performance degradation is likely to occur in the future. It is contemplated that decision 178 identifies and/or predicts transducing head performance degradation based on the models constructed in step 174 as well as data access conditions logged in step 176. In some embodiments, decision 176 corresponds with one or more test pattern of data bits being written and subsequently read by a transducing head.

In the event decision 176 determines performance degradation has occurred or is going to occur, step 180 proceeds to suspend data access operations to the data storage surface(s) corresponding to the degraded transducing head(s). The suspended data access operations allows decision 182 to verify the conclusion of decision 178, such as by conducting data read operations at a slower data storage medium rotating speed. If decision 182 verifies the results of decision 178, step 184 then alters the data surface(s) of the degraded transducing head(s) to decrease the data storage capacity of the data surface(s). If decision 182 contradicts decision 178, step 186 updates the prediction models by returning to step 174, which allows the prediction models to more accurately differentiate between normal and degraded transducing head operation.

FIG. 4 displays a top view line representation of a portion of an example data storage device 190 that has been re-manufactured in the field in accordance with various embodiments to decrease the data density to utilize a transducing head identified with current or future degraded performance. The data storage device 190 has a plurality of data bits 192 stored in a data storage medium 194 and accessed as part of a data surface 196. The data surface was initially formatted with a first linear separation distance 198, track pitch 200, and radial separation distance 202, as indicated by segmented lines, that provide a first data density. It is noted that the first data density may consist of multiple data density dimensions, such as linear, radial, and areal data bit density.

In response to a detected or predicted change in transducing head performance for the data surface 196, such as through execution of scheme 170, portions of the data surface 196 are re-manufactured to provide a reduced data capacity for the data surface 196, data storage medium 194, and data storage device 190. While the data capacity for the data storage device 190 may be decreased in a variety of different manners, the non-limiting embodiment shown by the solid lines in FIG. 4 illustrate how at least a portion of the data surface 196 can be re-manufactured with a lower data density to provide the decreased data capacity. That is, the data bits 192 are re-formatted in a different pattern compared to the first data density with increased linear data separation 204, track pitch 206, and radial separation distance 208.

Some embodiments may provide a decreased data density by increasing only one of the linear separation 204, radial separation 208, and track pitch 206 distances. For instance, existing data tracks 210 with the initial track pitch 200 and radial separation distance 202 may be utilized with increased linear separation distance 204 to provide a decreased data density and data capacity for the data surface 196. It is contemplated that different data tracks 210 of the data surface 296 have different linear data separation distances 204. The ability to tune the position of data bits on the data surface 196 allows more non-magnetic material to separate adjacent data bits 192, which eases the magnetic resolution and performance necessary for a transducing head to reliably and accurately conduct data bit 192 access operations.

FIG. 5 displays a top view line representation of a portion of an example data storage device 220 configured to provide reduced data capacity in accordance with various embodiments. The data storage device 220 has a plurality of data tracks 222 each separated into user data regions 224 and overhead data regions 226. Each data region 224 and 226 are populated with data bits 224, but the data in the overhead data region 226 are not accessible by a user and provide operating data, such as grey code and error correction codes, that are set with respect to the configuration of the data tracks 222.

The user data regions 224 collectively provide the data capacity for the data surface 228 and data storage medium 230. While the data bits 232 of the user data regions 226 can be re-manufactured with a lesser data density, as shown in FIG. 4, the data capacity of the data surface 228 may also be reduced by deactivating some, but not all, the data tracks 222 on the data surface 228 in response to detected or predicted transducing head degraded performance. In the example shown in FIG. 5, identification of degraded performance in the transducing head 234 can cause a controller to deactivate the data tracks 222 in the crosshatched region 236. The controller may deactivate the selected data tracks 222 by restricting the travel of the transducing head 234 to the non-crosshatched data tracks 222, which can be characterized as re-manufacturing by de-stroking the data storage device 220.

The deactivation of the crosshatched data tracks 222 may correspond with the archiving, caching, and re-writing of data stored to those data tracks 222. The de-stroking of the data surface 228 can better utilize the transducing head geometry to position the data writer and reader portions of the transducing head 234 more aligned with the center of each data track 222. In contrast, skew angle effects resulting from the pivot point of the transducing head 234 can reduce the amount of time the transducing head 234 flies over data tracks 222 near the inner diameter of the data surface 228.

Figure 6:
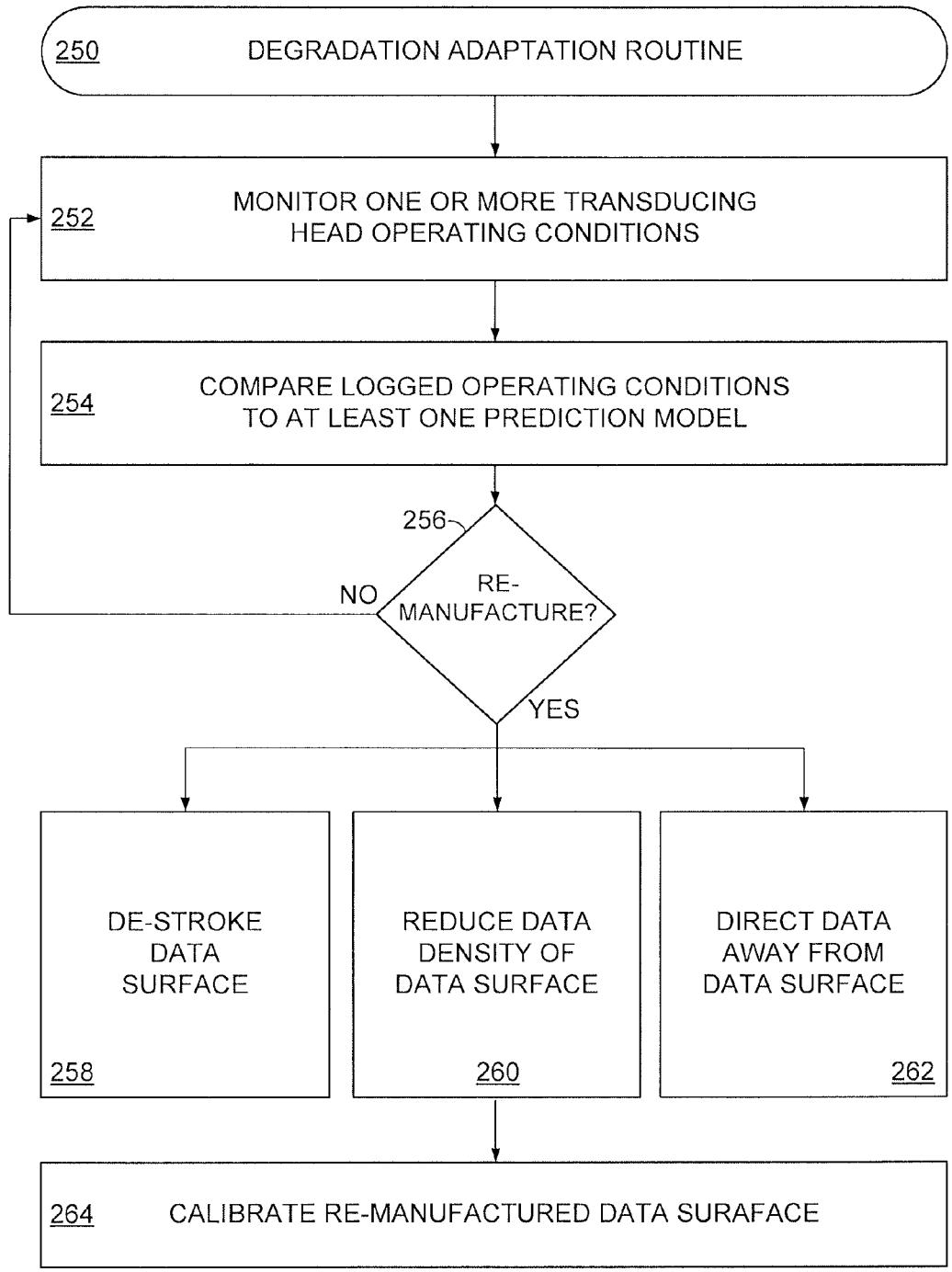
FIG. 6 plots an example degradation mitigation routine carried out in accordance with some embodiments.

FIG. 6 is an example degradation adaptation routine 250 that may be carried out in accordance with various embodiments to adapt to actual and predicted transducing head performance degradation. Step 252 initially monitors one or more transducing head operating conditions, such as BER, fly height, and number of data access operations. It is contemplated that step 252 can concurrently and individually monitor and log operating conditions for multiple different transducing heads that are positioned proximal different data storage surfaces of the same, or different, data storage media.

Step 254 proceeds to compare the static and/or dynamic operating conditions logged in step 252 to predict and/or detect transducing head performance degradation in relation to one or more prediction models, such as models constructed in scheme 170. The identification of an actual or likely future transducing head performance degradation can be handled in a variety of different manners in decision 256, none of which are required or limiting. In some embodiments, a controller chooses to do nothing by returning to step 252. In other embodiments, a controller re-manufactures a portion of the data storage device by de-stroking a data surface in step 258 to reduce the data capacity of at least one data surface. Such de-stroking can deactivate some, or all, of a data surface to reduce the active travel distance for at least one transducing head identified with current or future performance degradation.

A determination to re-manufacture a portion of the data storage device in step 256 can reduce the data capacity of a data surface by reducing the data density of a portion of a data surface in step 260. Reducing the data density may involve increasing the linear and/or radial separation distances between data bits as well as increasing the track pitch of at least one data track. The data surface may also be re-manufactured by directing data away from the data surface in step 262, such as by re-mapping logical and/or physical block addresses on the data surface. At the conclusion of steps 258, 260, and 262, step 264 can calibrate the re-manufactured data surface(s) to accommodate altered operating parameters, such as writ path data bit timing, read path data detector parameters, adjacent and side track erasure parameters, and media defect locations and lengths. The re-calibrated operating parameters can be stored in local and/or remote databases that reflect the reduced data capacity for the individual data surfaces as well as the overall data storage device.

It is noted that routine 250 is not required or limiting as various aspects can be changed and removed just as steps and decisions can be added. For example, assorted embodiments cache data prior to a data surface being re-manufactured. Such data caching can correspond with data being written back to the same data surface after re-manufacturing or written to a different data location, such as a remote data storage device, different data surface, or different data storage medium of the same data storage device. It is contemplated that caching of data during data surface re-manufacturing corresponds with a controller purging outdated data, such as metadata, prior to re-writing the cached data.

Although routine 250 is not limited to a particular application, various embodiments conduct data surface re-manufacturing in the field and after user defined data is stored to assorted portions of the data storage device. The ability to identify and predict transducing head performance degradation in the field allows a data storage device to adapt to changing data access performance characteristics. For example, scheme 170 and routine 250 can adapt to actual or predicted performance degradation by reducing the data capacity of at least one data surface, which allows a degraded transducing head to remain viable. In contrast, deactivating a degraded transducing head would greatly reduce the data storage capacity of a data storage device. Hence, utilizing a degraded transducing head in a reduced data capacity environment is better than completely losing the data capacity of the data surface corresponding with the degraded transducing head.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. A method comprising:
   accessing data bits stored on a first data storage medium with a first transducing head, the data bits organized on the first data storage medium to provide a first surface data capacity;
   predicting a performance degradation in the first transducing head with a controller connected to the first transducing head; and
   decreasing the first surface data capacity of the first data storage medium in response to the predicted performance degradation.

2. The method of claim 1, wherein the controller decreases the surface data capacity by deactivating at least one data track portion of the data storage medium.

3. The method of claim 1, wherein the controller decreases the surface data capacity by altering a number of data bits per inch on the data storage medium.

4. The method of claim 1, wherein the controller decreases the surface data capacity by 10%.

5. The method of claim 1, wherein the controller is connected to a second transducing head positioned proximal a second data storage medium having a second surface data capacity, the first and second data capacities being different.

6. The method of claim 5, wherein the first and second transducing heads access data bits concurrently on the respective first and second data storage mediums.

7. The method of claim 1, wherein the controller predicts the performance degradation by detecting an increase in bit error rate for accesses to data bits on the first data storage medium.

8. The method of claim 1, wherein the controller deactivates the first transducing head in response to the predicted performance degradation.

9. The method of claim 1, wherein the controller deactivates a data writer portion of the transducing head in response to the predicted performance degradation.

10. The method of claim 1, wherein the controller rewrites at least one data bit on the first data storage medium to decrease the first surface capacity.

11. A method comprising:
    accessing data bits stored on a data storage medium with a transducing head, the data bits organized on the data storage medium to provide a first surface data capacity;

predicting a performance degradation in the transducing head with a controller connected to the transducing head; and decreasing the first surface data capacity of the data storage medium in response to the predicted performance degradation while the transducing head accesses one or more data bits.

12. The method of claim 11, wherein an actuating extent of the transducing head is reduced to decrease the first surface area data capacity.

13. The method of claim 11, wherein a data bit density on the data storage medium is reduced to decrease the first surface data capacity.

14. The method of claim 11, wherein the controller calibrates the data bits of the data storage medium after decreasing the first surface data capacity.

15. The method of claim 14, wherein the decreased first surface data capacity is calibrated to mitigate a data erasure condition.

16. The method of claim 11, wherein the controller reactively decreases the first surface data capacity to a second surface data capacity in response to a detected transducing head performance degradation.

17. The method of claim 16, wherein the controller decreases the first surface data capacity and re-optimizes at least one data recovery parameter in the field.

18. The method of claim 11, wherein a fly height of the transducing head over the data storage medium is altered in response to the predicted performance degradation.

19. An apparatus comprising a data storage medium on which at plurality of data bits are stored and accessed by a transducing head, the plurality of data bits organized on the data storage medium to provide a surface data capacity, a prediction circuit configured to predict degradation in the transducing head with a controller connected to the transducing head, the controller configured to decrease the surface data capacity of the data storage medium in response to the predicted performance degradation.

20. The apparatus of claim 17, wherein the plurality of data bits stored on the surface of the data storage medium are programmed with user defined data.

* * * * *